(12) United States Patent
Qiu

(10) Patent No.: US 11,096,484 B2
(45) Date of Patent: Aug. 24, 2021

(54) LIFTING CABINET AND DEVICE THEREOF

(71) Applicant: CMECH (GUANGZHOU) LTD., Guangdong (CN)

(72) Inventor: Jia Sen Qiu, Guangdong (CN)

(73) Assignee: CMECH (GUANGZHOU) LTD., Guangdong (CN)

( * ) Notice: Subject to any disclaimer, the term of this patent is extended or adjusted under 35 U.S.C. 154(b) by 101 days.

(21) Appl. No.: 16/695,655

(22) Filed: Nov. 26, 2019

(65) Prior Publication Data

US 2021/0037966 A1 Feb. 11, 2021

(30) Foreign Application Priority Data

| Aug. 5, 2019 | (CN) | 201910717730.6 |
| Aug. 5, 2019 | (CN) | 201910718438.6 |
| Aug. 5, 2019 | (CN) | 201910718446.0 |
| Aug. 5, 2019 | (CN) | 201921261566.4 |

(51) Int. Cl.
*A47B 51/00* (2006.01)
*A47B 57/06* (2006.01)
(Continued)

(52) U.S. Cl.
CPC ............. *A47B 51/00* (2013.01); *A47B 57/06* (2013.01); *A47B 97/00* (2013.01); *B66D 1/12* (2013.01); *B66D 1/20* (2013.01); *B66D 1/26* (2013.01); *B66D 1/30* (2013.01); *B66D 1/36* (2013.01); *B66D 1/60* (2013.01); *B66D 3/18* (2013.01); *B66D 3/26* (2013.01); *F16H 25/20* (2013.01);
(Continued)

(58) Field of Classification Search
CPC ... A47B 51/00; A47B 2051/005; A47B 57/06; A47B 61/02; A47B 2220/0091; B65G 37/005; B66B 9/00
See application file for complete search history.

(56) References Cited

U.S. PATENT DOCUMENTS

| 3,074,766 A | * | 1/1963 | Meyer | A47B 88/493 |
| | | | | 384/18 |
| 3,743,366 A | * | 7/1973 | Tazaki | A47B 88/493 |
| | | | | 384/18 |

(Continued)

FOREIGN PATENT DOCUMENTS

| AT | 514056 A4 | 10/2014 |
| CN | 201088284 Y | 7/2008 |

(Continued)

OTHER PUBLICATIONS

Translation of CN 203885023, 4 pages (Year: 2014).*
(Continued)

*Primary Examiner* — Andrew M Roersma
(74) *Attorney, Agent, or Firm* — McKee, Voorhees & Sease, PLC

(57) ABSTRACT

A lifting cabinet has left and right lifting mechanisms each comprising a steel cable; a power mechanism which is connected with a first end of the steel cable; an internal guide rail which is connected with a second end of the steel cable; and an external guide rail which is fixed on a frame of the lifting cabinet and is configured with an accommodation space therein. The internal guide rail is located within the accommodation space. The lifting cabinet solves the problem of exposure of the steel cable.

16 Claims, 7 Drawing Sheets

(51) Int. Cl.
*A47B 97/00* (2006.01)
*F16H 25/20* (2006.01)
*F16H 25/22* (2006.01)
*B66D 1/12* (2006.01)
*B66D 1/20* (2006.01)
*B66D 1/26* (2006.01)
*B66D 1/30* (2006.01)
*B66D 1/36* (2006.01)
*B66D 1/60* (2006.01)
*B66D 3/18* (2006.01)
*B66D 3/26* (2006.01)

(52) U.S. Cl.
CPC .. *F16H 25/2204* (2013.01); *A47B 2220/0002* (2013.01); *A47B 2220/0091* (2013.01)

(56) References Cited

U.S. PATENT DOCUMENTS

| | | | |
|---|---|---|---|
| 4,239,440 A | | 12/1980 | James |
| 5,535,852 A | * | 7/1996 | Bishop .............. B66B 9/00 187/336 |
| 5,715,759 A | * | 2/1998 | Lee .................. A47B 9/12 108/147 |
| 6,676,233 B1 | | 1/2004 | Evans et al. |
| 7,416,055 B2 | | 8/2008 | Penn et al. |
| 8,820,003 B2 | * | 9/2014 | DeLorean .......... A47B 81/00 52/29 |
| 9,420,881 B2 | * | 8/2016 | Reid .................. A47B 51/00 |
| 9,486,911 B1 | | 11/2016 | Liu |
| 2006/0066188 A1 | | 3/2006 | Crawford |
| 2007/0108791 A1 | | 5/2007 | Okninski |
| 2014/0196555 A1 | | 7/2014 | Wu |

FOREIGN PATENT DOCUMENTS

| | | | | |
|---|---|---|---|---|
| CN | 201480544 U | | 5/2010 | |
| CN | 201630649 U | * | 11/2010 | |
| CN | 202737328 U | | 2/2013 | |
| CN | 203885023 U | | 10/2014 | |
| CN | 203934851 U | | 11/2014 | |
| CN | 203934862 U | | 11/2014 | |
| CN | 204132770 U | | 2/2015 | |
| CN | 104466831 A | | 3/2015 | |
| CN | 205018553 U | | 2/2016 | |
| CN | 105595641 A | | 5/2016 | |
| CN | 109276039 A | | 1/2019 | |
| CN | 109733994 A | | 5/2019 | |
| CN | 109795952 A | | 5/2019 | |
| CN | 208988054 U | | 6/2019 | |
| CN | 109984467 A | | 7/2019 | |
| DE | 19537135 A1 | * | 4/1997 | ............. A47B 46/00 |
| GB | 2530130 A | * | 3/2016 | ............. A47B 51/00 |
| GB | 2557699 A | | 6/2018 | |
| JP | 2014226508 A | | 12/2014 | |
| KR | 1020130138069 A | | 12/2013 | |
| WO | WO-9949757 A1 | * | 10/1999 | ............. A47B 51/00 |
| WO | 2010130570 A1 | | 11/2010 | |

OTHER PUBLICATIONS

Translation of CN 203934851, 2 pages (Year: 2014).*
Translation of CN 203934862, 3 pages (Year: 2014).*
Translation of KR 20130138069, 14 pages (Year: 2013).*
Translation of WO 2010130570, 6 pages (Year: 2010).*

* cited by examiner

LIFTING CABINET AND DEVICE THEREOF

PRIORITY CLAIMS AND INCORPORATION OF RELATED APPLICATIONS

This application claims priority to the following four Chinese applications, and incorporate by reference their related pending US applications in their entireties:

(A) Chinese application 201910718446.0, filed Aug. 5, 2019;

(B) Chinese application 201921261566.4, filed Aug. 5, 2019 and U.S. Ser. No. 16/695,659, filed Nov. 26, 2019, MVS Ref No. P13067US00;

(C) Chinese application 201910717730.6, filed Aug. 5, 2019, and U.S. Ser. No. 16/695,789, filed Nov. 26, 2019, MVS Ref No. P13069US00;

(D) Chinese application 201910718438.6, filed Aug. 5, 2019, and U.S. Ser. No. 16/695,850, filed Nov. 26, 2019, MVS Ref No. P13070US00.

FIELD OF THE INVENTION

The present invention relates to the technical field of lifting cabinets, in particular to a lifting cabinet and lifting device thereof.

BACKGROUND OF THE INVENTION

With an increasing housing price, the indoor space is becoming tighter. A lifting cabinet is marketed in order to make full use the indoor space. This lifting cabinet is generally assembled in a higher indoor position to help the user to improve the utilization of the indoor space.

However, the present lifting device of a lifting cabinet generally uses a drive motor, steel cables, fixed pulleys and movable pulleys together in order to achieve a labor-saving effect. If the lifting device is assembled in a lifting cabinet without a cabinet door or in a lifting cabinet with cabinet doors to be opened, a stay cord located above the cabinet will be exposed when the cabinet moves downward, as the fixed pulleys are fixed on the upper part of the cabinet, which will affect aesthetic appearance and cause damages of the stay cord, thereby the lifting device has a small applicable range, and is not suitable to be assembled in the lifting cabinet without a cabinet door.

SUMMARY OF THE INVENTION

Therefore, it is an objective of the present invention to provide a lifting device, which allows to solve the problem of steel cable exposure.

The invention is a lifting device, comprising a steel cable; a power mechanism which is connected with a first end of the steel cable; a lifting mechanism comprising an internal guide rail which is connected with a second end of the steel cable; and an external guide rail which is fixed on a frame of a lifting cabinet and is configured with an accommodation space therein; wherein the internal guide rail is placed in the accommodation space and is movable vertically along the length of the external guide rail by the power mechanism.

The above-mentioned lifting device moves the internal guide rail or follower upward or downward in the accommodating space along a length of the external guide rail or track, thereby the storage shelf can move upward or downward accordingly. The upper end of the internal guide rail is connected to the power mechanism by the steel cable. Unlike the lifting device in the prior art, in which the steel cable is exposed above the storage shelf, the second end of the cable is located in the accommodating space when the internal guide rail moves upward or downward, thereby the problem of exposure of steel cable is solved, and a better appearance of the lift cabinet is obtained.

Further, the accommodation space comprises a first accommodation space used for accommodating the internal guide rail; and a second accommodation space located above the first accommodation space and used for accommodating the second end of the cable; wherein, the first accommodation space is separated from the second accommodation space by the upper end of the internal guide rail. When the internal guide rail moves downward along the extending direction of the external guide rail, the volume of the first accommodation space becomes smaller, and accordingly the volume of the second accommodation space becomes larger; when the internal guide rail moves upward in the extending direction of the external guide rail, the volume of the first accommodation space becomes larger, and accordingly the volume of the second accommodation space becomes smaller.

Further, a guide groove is further disposed between the internal guide rail and the external guide rail, and the guide groove is configured along a length of the external guide rail; the lifting mechanism further comprises a guide element which is disposed in the guide groove and moves up and down along a length of the guide groove.

Further, an outer surface of the internal guide rail is provided with a first groove which extends along a length of the internal guide rail; an inner surface of the external guide rail is provided with a second groove which extends along a length of the external guide rail; when the internal guide rail is placed in the accommodation space, the first groove is cooperated with the second groove to form the guide groove.

Further, the guide element is connected to the first groove or the second groove; the lifting mechanism further comprises a stopper connected to the first groove or the second groove; when the internal guide rail moves downward, a distance between the guide element and the stopper gradually decreases, and the internal guide rail will stop when the guide element abuts against the stopper.

Further, the guide element is connected to a lower end of the second groove; the stopper is connected to a middle of the first groove; when the internal guide rail moves downward, the stopper moves with the internal guide rail, and the internal guide rail will stop when the stopper abuts against the guide element.

Further, the power mechanism comprises a motor; a screw rod which is in transmission connection with the motor and has an lifting end and a lowering end; a nut for the screw rod which is sleeved on the screw rod and moves along a length of the screw rod, and the nut for the screw rod is coupled to the first end.

Further, a first travel switch is provided on the lowering end for generating a first stop signal when the nut for the screw rod contacts with the first travel switch.

Further, a second travel switch is further disposed right above the internal guide rail for generating a second stop signal when the internal guide rail moves upward and an upper end of the internal guide rail contacts with the second travel switch.

The present invention also provides a lifting cabinet, comprising the above-mentioned lifting device. The frame of the lifting cabinet is further provided with a separate space for accommodating the power mechanism. The separate space is provided with a through-hole, which is used for communicating the separate space and the accommodation space.

For a better understanding and practice, the present invention will be described in detail below with reference to accompanying figures.

Figure 1:
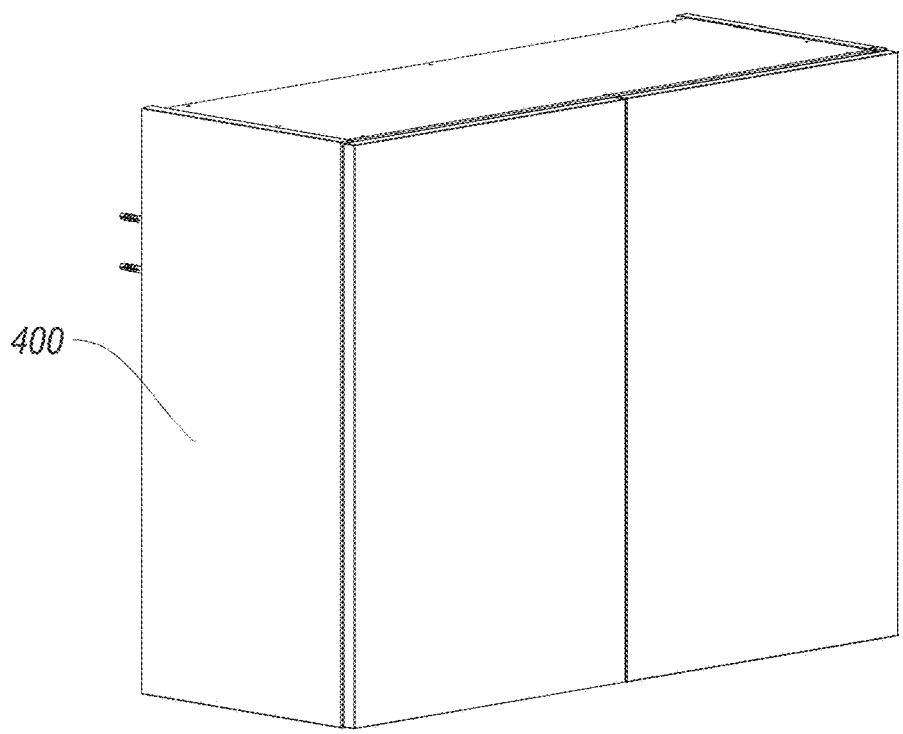
FIG. 1 is a schematic view of a lifting cabinet of the present invention.

LIST OF REFERENCE NUMBERS 100 lifting mechanism
110 external guide rail
111 second groove
120 internal guide rail
121 first groove
122 second connection
131 first accommodation space
132 second accommodation space
140 guide element
150 stopper
200 power mechanism
210 motor
220 screw rod
221 lifting end of rod 220
222 lowering end of rod 220
230 nut for the screw rod
300 steel cable
310 first end of cable 300
320 second end of cable 300
400 lifting cabinet
410 frame
420 storage shelf
430 first travel switch
440 second travel switch
450 separate space
460 through-hole
461 first connection

DETAILED DESCRIPTION OF THE PREFERRED EMBODIMENTS

In order to completely understand the objectives, characteristics and effects of the present invention, the concepts, detailed structure and resultant technical effect of the present invention will be further explained hereinafter with reference to the accompanying figures.

As shown in FIG. 1 to FIG. 8, the present invention provides a lifting cabinet 400 with a shelf 420, and a lifting mechanism 100 for each end of a cabinet shelf 420. Each lifting mechanism 100 comprising a steel cable 300; a power mechanism 200 which is connected with a first end 310 of the steel cable 300; and a lifting mechanism 100. The left and right lifting mechanisms 100 each further comprise an internal guide rail or follower 120 which is connected with a second end 320 of the steel cable 300; and an external guide rail or track 120 which is fixed on a frame 410 of a lifting cabinet 400 and is configured with an accommodation space therein. The internal guide rail 120 is located in the accommodation space and may move vertically along a length of the external guide rail 110 by the power mechanism 200.

Specifically, the lifting mechanisms 100 on the left and right ends of the shelf 420 each moves the associated left or right internal guide rail 120 upward or downward in the accommodation space along the length of the left or right external guide rail 110, thereby the storage shelf 420 can move upward or downward accordingly wherein an upper end of the internal guide rail 120 is connected to the power mechanism 200 through the steel cable 300. Unlike the lifting device in the prior art, in which the steel cable is exposed above the storage shelf, the second end 320 of the steel cable is located in the accommodation space, when the internal guide rail moves upward or downward, thereby the problem of the exposure of the steel cable is solved and a better appearance of the lifting cabinet 400 is obtained.

Figure 7:
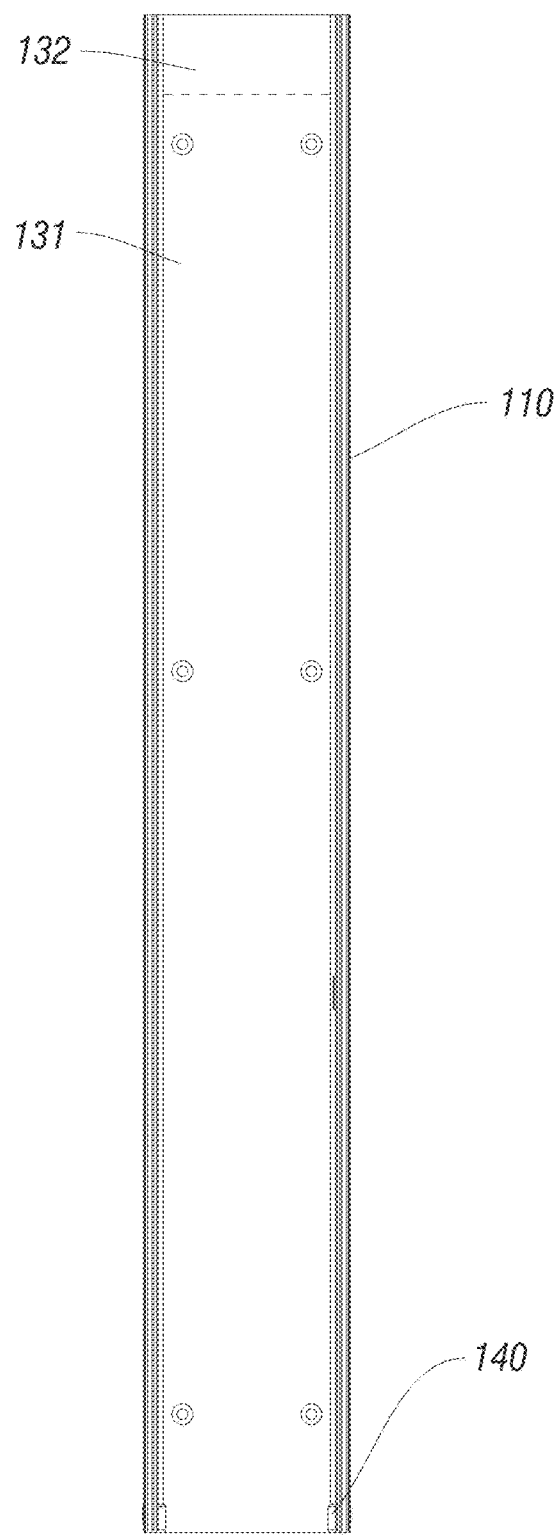
FIG. 7 is an elevation view of an external guide rail in the lifting device of the present invention.

As the lifting cabinet in the prior art generally uses a drive motor, steel cables, fixed pulleys and movable pulleys together to achieve a labor-saving effect, multiple steel cables will be provided between the driving motor, the fixed pulleys and the movable pulleys. These steel cables are likely to be entangled, which will affect the normal use of the lift cabinet. In order to solve this problem, further, as shown in FIG. 7, the accommodation space comprises a first accommodation space 131 which is used for accommodating the internal guide rail 120; and a second accommodation space 132 which is located above the first accommodation space 131 and used for accommodating the second end 320 of the cable 300. The first accommodation space 131 is separated from the second accommodation space 132 by the upper end of the internal guide rail 120.

When the internal guide rail 120 moves downward along the extending direction of the external guide rail 110, the volume of the first accommodation space 131 becomes smaller, and accordingly the volume of the second accommodation space 132 becomes larger. When the internal guide rail 120 moves upward in the extending direction of the external guide rail 110, the volume of the first accommodation space 131 becomes larger, and accordingly the volume of the second accommodation space 132 becomes smaller.

Specifically, when the internal guide rail 120 descends along the length direction of the external guide rail 110 the volume of the second accommodation space 132 becomes larger, so as to accommodate the steel cable in the second accommodation space. Therefore, the present invention only needs to connect the power mechanism 200 to the upper end of the internal guide rail 120 by the steel cable 300, rather than provide multiple steel cables, thereby avoiding entanglement of the steel cables. Moreover, the steel cable 300 moves in the second accommodation space 132 without interfering with other components, which can prevent the steel cable 300 from being damaged and ensure the normal use of the lifting device.

Figure 5:
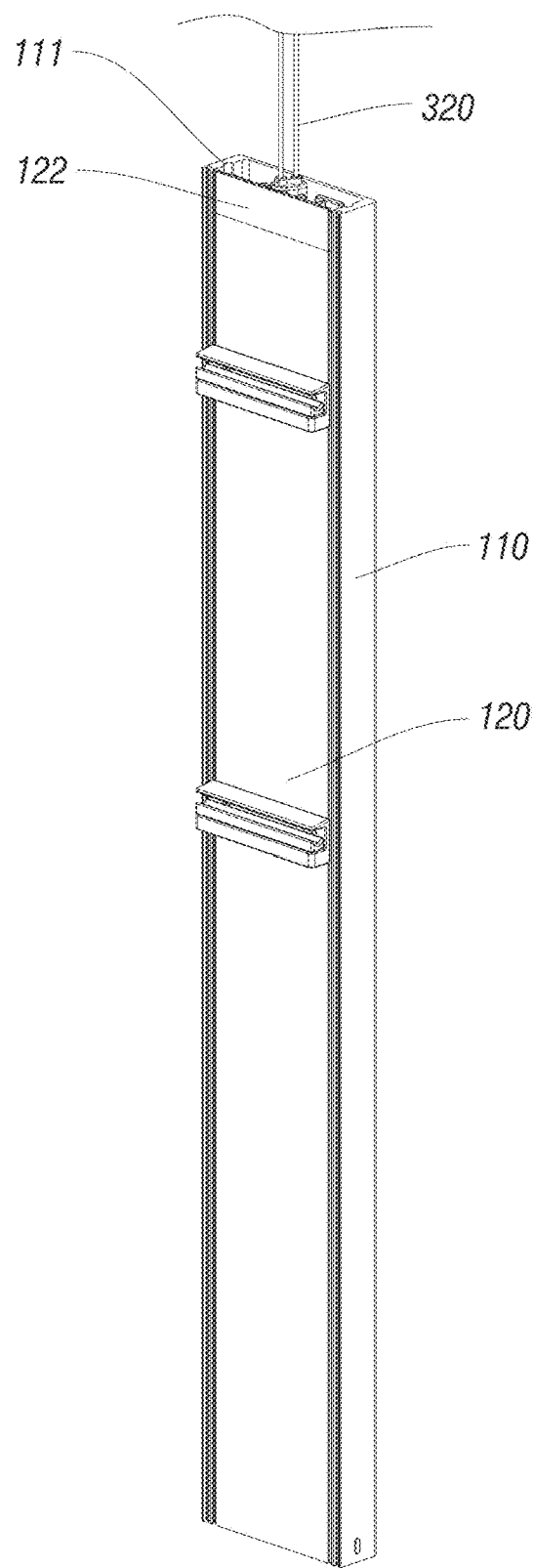
FIG. 5 is a schematic view of a lifting device of the present invention.
Figure 6:
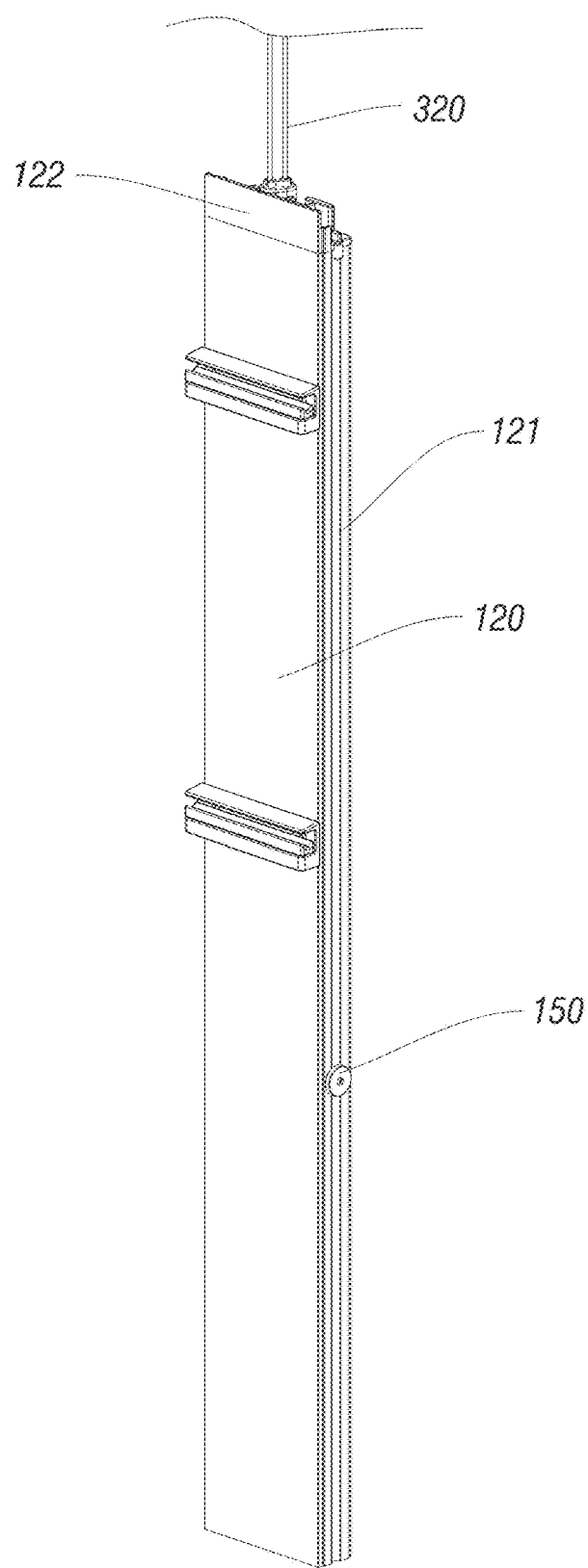
FIG. 6 is a schematic view of an internal guide rail in the lifting device of the present invention.

Further, as shown in FIG. 5 to FIG. 7, a guide groove is further disposed between the internal guide rail 120 and the external guide rail 110, and the guide groove is configured along the length of the external guide rail 110. The lifting mechanism 100 further comprises a guide element 140, it is disposed in the guide groove and moves up and down along the length of the guide groove. The guide element moves in the guide groove to ensure that the internal guide rail 120 won't shift during the descending or lifting process, thereby ensuring normal use of the lifting device.

Preferably, as shown in FIG. 5 to FIG. 7, an outer surface of the internal guide rail 120 is provided with a first groove 121 which extends along the length of the internal guide rail 120, and an inner surface of the external guide rail 110 is provided with a second groove 111 which extends along the length of the external guide rail 110. When the internal guide rail 120 is placed in the first accommodation space 131, the first groove 121 is cooperated with the second groove 111 to form the guide groove. The guide element 140 can be arranged in the guide groove 111, 121, to guide the descending or the lifting movement of the internal guide rail 120.

Further, as shown in FIG. 6, in order to prevent the internal guide rail 120 from moving to an undesirable position, the guide element 140 is connected to the first groove 121 or the second groove 111. The lifting mechanism 100 further comprises a stopper 150 connected to the first groove 121 or the second groove 111. When the internal guide rail 120 moves downward, a distance between the guide element 140 and the stopper 150 gradually decreases, and the internal guide rail 120 will stop when the guide element 140 abuts against the stopper 150, thereby preventing a series of problems caused by the falling of internal guide rail and the storage shelf connected to the internal guide rail.

In one of the embodiments, the guide element 140 is connected to a lower end of the second groove 111, the stopper 150 is connected to the middle of the first groove 121. When the internal guide rail 120 moves downward, the stopper 150 moves with it, and the descending movement of the internal guide rail 120 will stop when the stooper 150 abuts against the guide element 140, thereby preventing the internal guide rail 120 and the storage shelf 420 connected to the internal guide rail from falling 120.

In another embodiment, the guide element 140 may also be connected to the upper end of the first groove 121, the stopper 150 is connected to the middle of the second groove 111. When the internal guide rail 120 moves downward, the guide element 140 moves with it, and the descending movement of the internal guide rail 120 will stop when the guide element 140 abuts against the stopper 150, thereby preventing the internal guide rail 120 and the storage shelf 420 connected to the internal guide rail from falling.

Figure 8:
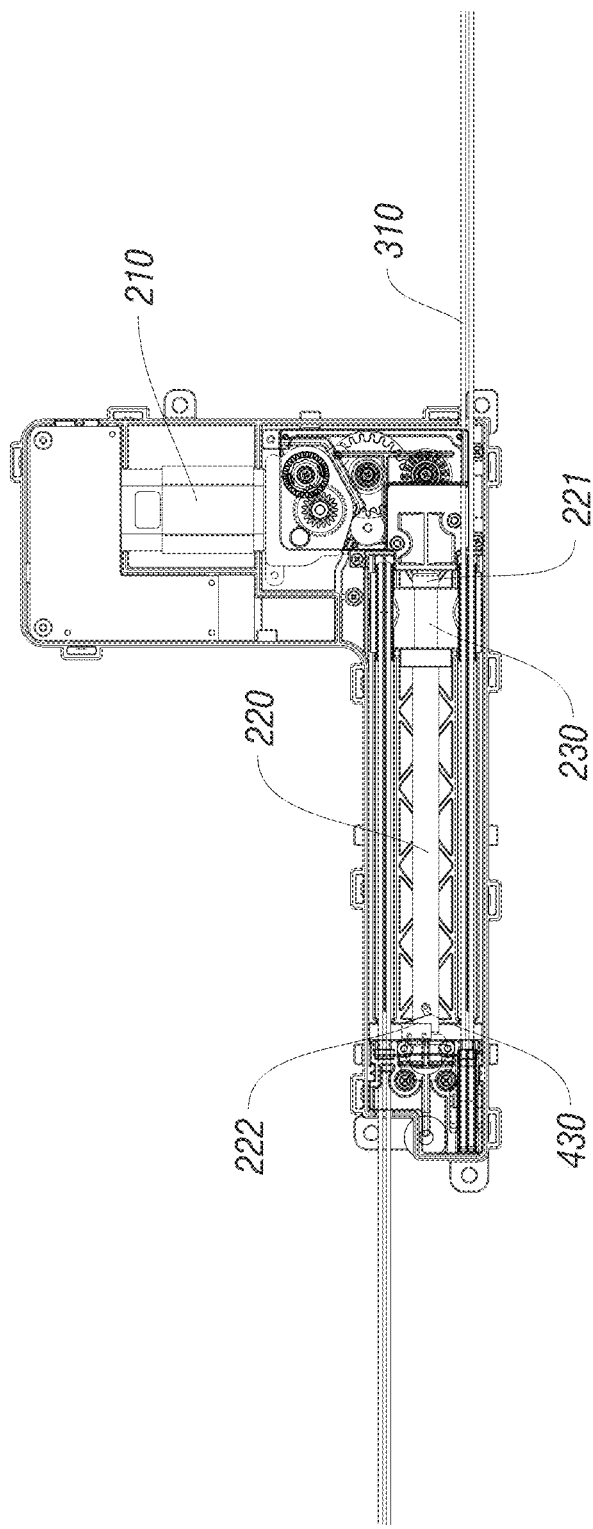
FIG. 8 is a schematic view of a power mechanism of the lifting device of the present invention.

Further, as shown in FIG. 8, the power mechanism 200 comprises a motor 210; a screw rod 220 which comprises an lifting end 221 and a lowering end 222 and is in transmission connection with the motor 210; a nut 230 for the screw rod 220 which is sleeved on the screw rod 220 and moves along a length of the screw rod 220, and the nut 230 for the screw rod is coupled to the first end 310 of the cable 300.

Specifically, the screw rod 220 rotates under the action of the motor 210, driving the nut 230 for the screw rod to move between the lifting end 221 and the lowering end 222. When the storage shelf 420 needs to be lowered, the screw rod 220 rotates in a direction to drive the nut 230 to move from the lifting end 221 to the lowering end 222, lowering the steel cable 300 and the internal guide rail 120 by gravity. When the storage shelf 420 needs to be lifted, the screw rod 220 moves in the reverse direction, to drive the nut 230 for the screw to move from the lowering end 222 to the lifting end 221, pulling the steel cable 300 and the internal guide rail 120 upwardly.

In addition, since the power mechanism 200 uses a motor, a screw rod and a nut for the screw rod together, the lifting device can achieve a labor-saving effect, so that a low-power motor can be applied in the lifting device to save space.

Further, as shown in FIG. 8, a first travel switch 430 is provided on the lowering end 222 for generating a first stop signal, when the nut 230 for the screw rod 220 contacts with the first travel switch 430.

Figure 4:
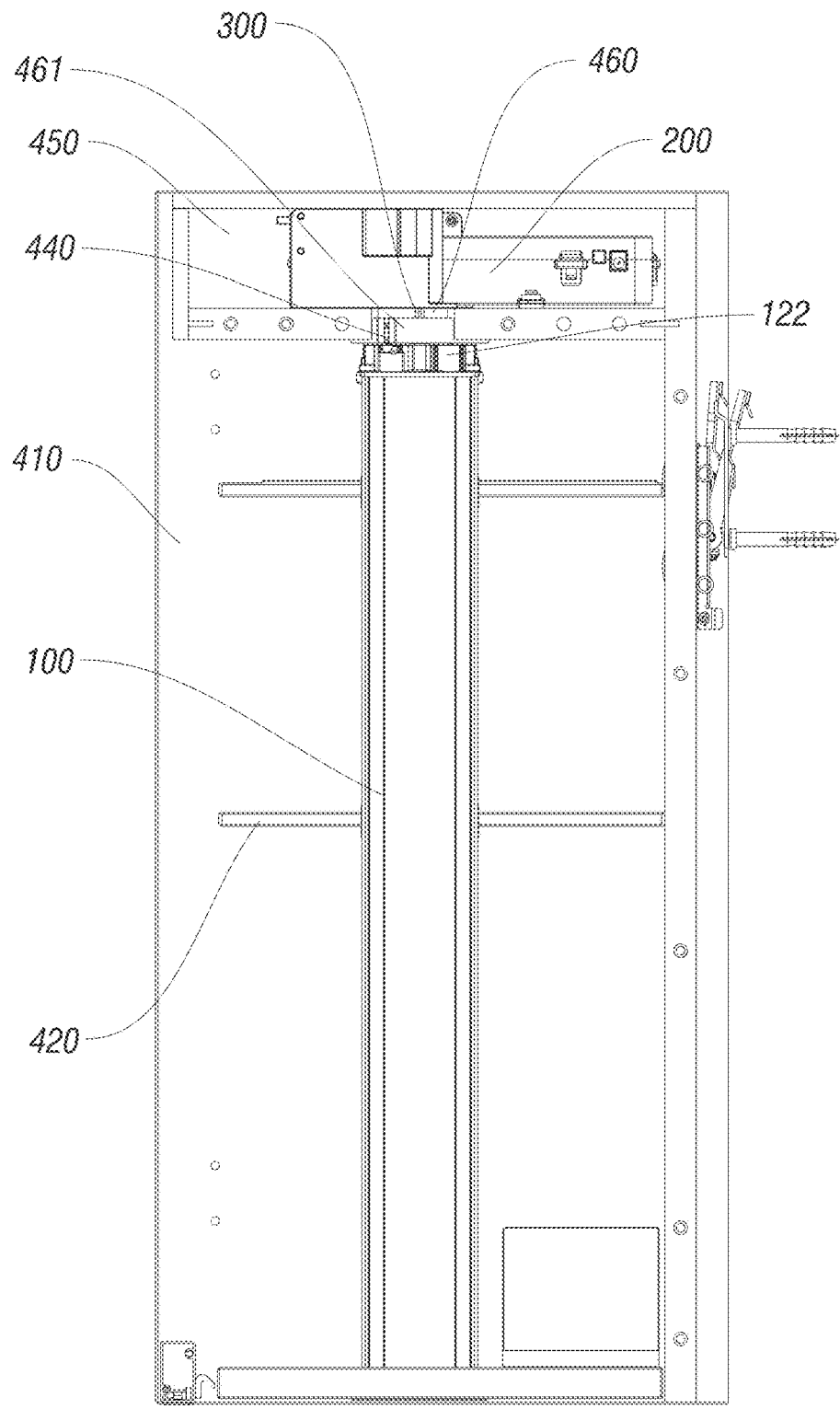
FIG. 4 is a side view of a lifting cabinet of the present invention taken along lines 4-4 of FIG. 2.

Further, as shown in FIG. 4, a second travel switch 440 is further disposed right above the internal guide rail 120 for generating a second stop signal when the internal guide rail 120 moves upward and its upper end contacts with the second travel switch 440.

The lifting device further comprises a control mechanism which is electrically connected to the first travel switch 430 for receiving a first stop signal. The control mechanism is further electrically connected to the motor 210 for stopping the motor 210 according to the first stop signal. A descending distance of the internal guide rail is limited by the first travel switch 430 to prevent the storage shelf 420 from falling too much. The control mechanism is further electrically connected to the second travel switch 440 for receiving a second stop signal. The control mechanism is further electrically connected to the motor 210 for stopping the motor 210 according to the second stop signal. An ascending distance of the inner rail 120 is limited by the second travel switch 440, to reset the storage shelf 420 to its raised position.

It should be noted that the specific manner of processing and analyzing the first and second stop signals may be determined according to the signal type and processing requirements, and may be well-known in the art, which is not limited herein.

Figure 2:
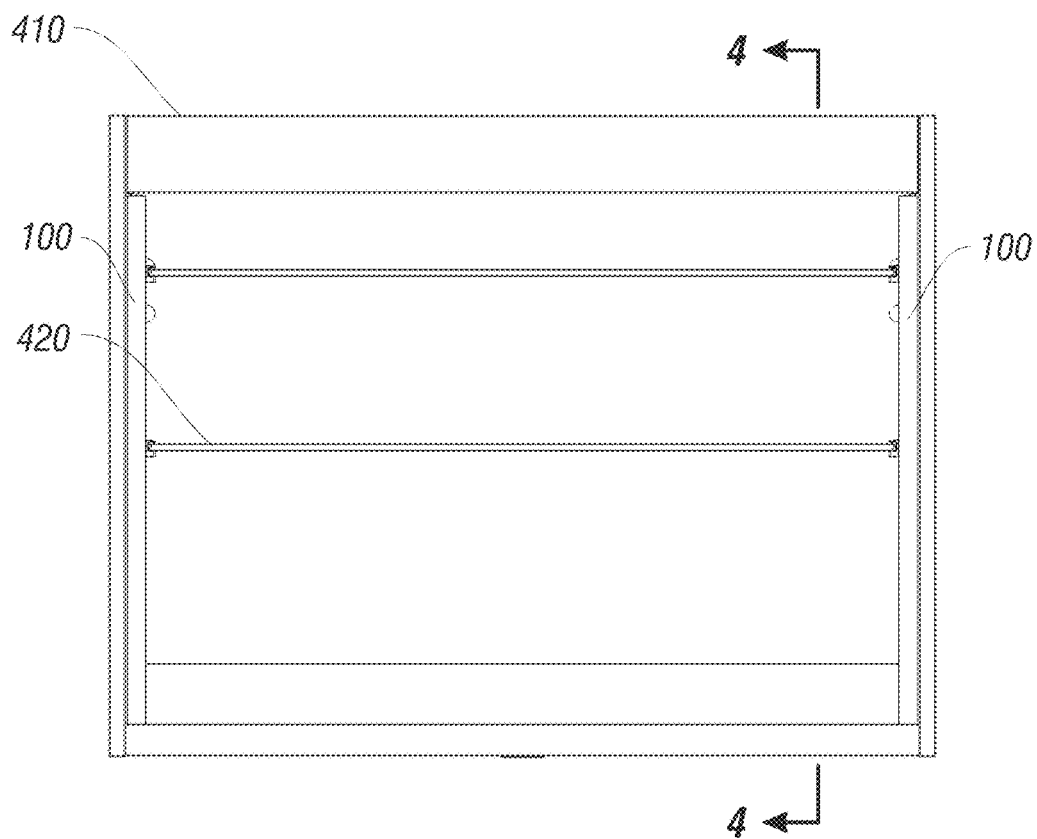
FIG. 2 is a front view of a lifting cabinet of the present invention; with the doors removed for clarity.
Figure 3:
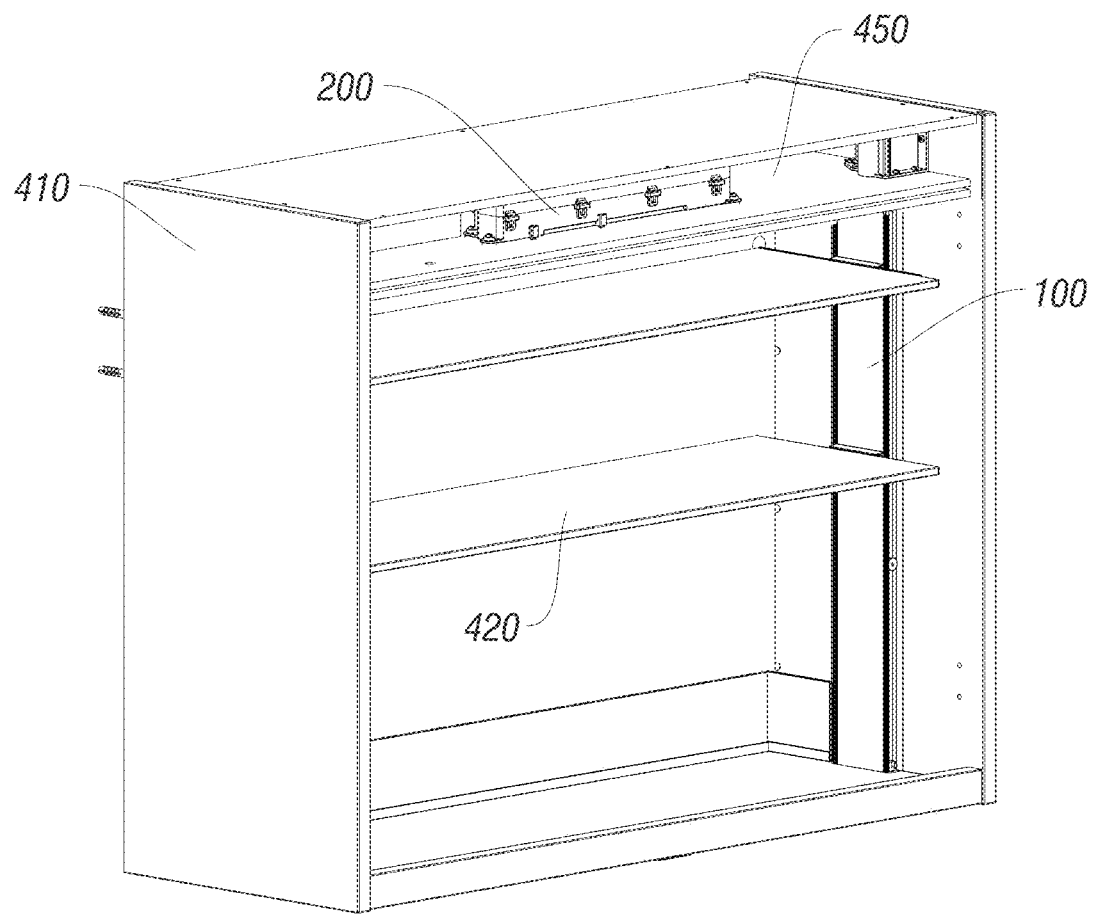
FIG. 3 is a schematic view of a lifting cabinet of the present invention with the upper front cover removed for clarity.

The present invention also provides a lifting cabinet 400, as shown in FIG. 2 to FIG. 4, comprising the lifting device hereinbefore. A separate space 450 is further configured on the frame 410 of the lifting cabinet 400 for accommodating the power mechanism 200 and is located above the storage shelf 420. The separate space 450 is further provided with a through hole 460, which is used for connecting with the separate space 450 and the accommodation space 132. By arranging the power mechanism in the separate space 450 above the storage shelf 420, the power mechanism 200 and the first end of the steel cable connected to the power mechanism will not be directly exposed even when the cabinet door is opened, thereby preventing damage of the steel cable 300 and the power mechanism 200. Moreover, the through-hole 460 is provide in the separate space 450 to connect with the accommodation space, and the steel cable 300 can be connected to the upper end of the internal guide rail 120 through the through-hole 460, thereby ensuring that the power mechanism drives the internal guide rail 120 to perform a lowering motion or a lifting motion.

It should be noted that, in order to understand the technical content conveniently, the cabinet door and the baffle of the separate space close to the cabinet door are omitted in FIG. 3, and the internal side plate on the frame is omitted in FIG. 4.

Preferably, a first connection 461, configured on the frame, is secured in the through-hole of the separate space, and the second travel switch is fixed on the first connection. A second connection 122 is configured on the upper end of the internal guide rail, so that the second connection 122 will trigger the second travel switch on the first connection to generate a second stop signal when the internal guide rail is reset.

It should be noted that one skilled in the art may incorporate or combine different embodiments or examples, or technical features of different embodiments or examples disclosed in the description together if there are no contradictions.

In the description of the present invention, it should be understood that the terms "longitudinal", "lateral", "front", "back", "left", "right", "vertical", "horizontal", "top", "bottom", "inner", and "outer", etc., indicate direction or position relation is based on the direction or position relation shown in figures, and is only for convenience of describing the present invention and simplifying the description, rather than indicating or implying that the indicated apparatus or parts must be configured or operated in specific direction. Therefore, these terms should not be deemed as a limit to the content protected by the present invention.

If the terms "first", "second", etc. are used herein to define a component, one skilled in the art should understand that usage of terms "first" and "second" is only for the convenience of describing the present invention and simplifying the description. Unless otherwise stated, the terms hereinbefore have no specific meanings.

The present invention is not limited to the above embodiments. Any variations or modifications without departing from the spirit and scope of the invention and within the scope of claims and equivalent technology of the present invention will be also contained in the present invention.

What is claimed is:

1. A lifting device for a lifting cabinet, comprising:
   a cable operatively connected to a shelf of the lifting cabinet;
   a power mechanism connected to a first end of the cable; and
   a lifting mechanism operatively connected to the power mechanism, and having an internal guide rail connected to a second end of the cable and an external guide rail fixed on a frame of the lifting cabinet and configured with an accommodation space therein;
   wherein the internal guide rail is placed in the accommodation space and is movable vertically along a length of the external guide rail by the power mechanism to raise and lower the shelf relative to the frame;
   the power mechanism comprising:
   a motor at the top of the cabinet;
   a horizontal screw rod extending laterally between opposite sides of the cabinet at the top of the cabinet and being in transmission connection with the motor and having a lifting end and a lowering end; and
   a nut on the screw rod and movable along a length of the screw rod, the nut for being coupled to the first end of the cable;
   a first travel switch is provided on the lowering end of the screw rod for generating a first stop signal when the nut contacts with the first travel switch; and
   a second travel switch is disposed above the internal guide rail for generating a second stop signal when the internal guide rail moves upward and an upper end of the internal guide rail contacts with the second travel switch.

2. The lifting device according to 1, wherein the accommodation space comprises:
   a first accommodation space, used for accommodating the internal guide rail;
   a second accommodation space, located above the first accommodation space and used for accommodating the second end of the cable;
   wherein the first accommodation space is separated from the second accommodation space by an upper end of the internal guide rail;
   when the internal guide rail moves downward along an extending direction of the external guide rail, a volume of the first accommodation space becomes smaller, and accordingly a volume of the second accommodation space becomes larger; and
   when the internal guide rail moves upward in an extending direction of the external guide rail, the volume of the first accommodation space becomes larger, and accordingly the volume of the second accommodation space becomes smaller.

3. The lifting device according to claim 1, wherein a guide groove is disposed between the internal guide rail and the external guide rail, and the guide groove is configured along a length of the external guide rail;
   the lifting mechanism further comprising a guide element which is disposed in the guide groove and is moveable upward and downward along a length of the guide groove.

4. The lifting device according to claim 3, wherein a first surface of the internal guide rail is provided with a first groove which extends along a length of the internal guide rail;
   a second surface of the external guide rail is provided with a second groove which extends along a length direction of the external guide rail; and
   when the internal guide rail is placed in the accommodation space, the first groove is cooperated with the second groove to form the guide groove.

5. The lifting device according to claim 4, wherein the guide element is connected to the first groove or the second groove;
   the lifting mechanism further comprises a stopper connected to the first groove or the second groove; and
   when the internal guide rail moves downward, a distance between the guide element and the stopper gradually decreases, and the internal guide rail will stop moving when the guide element abuts against the stopper.

6. The lifting device according to claim 5, wherein the guide element is connected to a lower end of the second groove;
   the stopper is connected to a middle of the first groove; and
   when the internal guide rail moves downward, the stopper moves with the internal guide rail, and the internal guide rail will stop moving when the stopper abuts against the guide element.

7. A lifting cabinet, comprising the lifting device according to claim 1, wherein a separate space is provided on the frame of the lifting cabinet for accommodating the power mechanism; a through-hole is provided on the separate space for communicating the separate space and the accommodation space.

8. A lifting cabinet having a vertically movable shelf, the cabinet comprising:
   a body having a top, a bottom and opposite sides, with each said side having a first guide rail fixed to the side and a second guide rail slidably mounted in the first guide rail for vertical movement along the first guide rail;

the first and second guide rails residing within the cabinet;
a shelf extending between the second guide rails for movement with the second guide rails;
an electric reversible motor adjacent the top of the cabinet;
a horizontal screw rod operatively connected to the motor at the top of the cabinet;
a pair of cables having first ends connected to the screw rod and extending in opposite lateral directions with second ends connected to the second guide rails;
whereby actuation of the motor in opposite directions rotates the screw rod in opposite directions so as to extend and retract the cables thereby lowering and raising the shelf, respectively, while the body remains stationary;
a nut on the horizontal screw rod and movable along a length of the horizontal screw rod, the nut being coupled to the first ends of the pair of cables;
a first travel switch is provided on a lowering end of the horizontal screw rod for generating a first stop signal when the nut contacts with the first travel switch; and
a second travel switch is disposed above the second guide rail for generating a second stop signal when the second guide rail moves upward and an upper end of the second guide rail contacts with the second travel switch.

9. The lifting cabinet of claim 8 wherein the cables are hidden from view when the shelf is in a raised position and in a lowered position.

10. The lifting cabinet of claim 8 wherein the second guide rails each have a stopper and the first guide rails each have an element, whereby the stoppers engage the elements to limit downward movement of the shelf.

11. The lifting cabinet of claim 8 wherein the second travel switch is operatively connected to the motor to limit upward movement of the shelf.

12. The lifting cabinet of claim 8 further comprising a groove along the first and second guide rails and a guide element engaging the groove to control movement of the first guide rail along the second guide rail.

13. The lifting cabinet of claim 8 wherein the nut is threadably mounted on the screw rod for movement in opposite directions on the screw rod when the motor is actuated in opposite directions.

14. A lifting cabinet, comprising:
a frame forming a top, a bottom, and opposite left and right sides of the lifting cabinet;
left and right vertical guide tracks on the left and right sides, respectfully;
left and right guide followers slidably mounted to the left and right guide tracks, respectfully, for up and down movement along the guide tracks;
a powered actuator operatively connected to the left and right guide followers via cables extending laterally from a sliding piece on the powered actuator, wherein actuation of the powered actuator slides the sliding piece laterally to raise and lower the guide followers;
a shelf mounted to the left and right guide followers for movement with the followers between raised and lowered positions;
the powered actuator being adjacent the top of the cabinet and out of sight when the shelf is in both the raised and lowered positions;
wherein the powered actuator is a screw rod, and the sliding piece is a nut threadably mounted on the screw rod;
a first travel switch is provided on a lowering end of the screw rod for generating a first stop signal when the nut contacts with the first travel switch; and
a second travel switch is disposed above one of the left and right guide followers for generating a second stop signal when the one of the left and right guide followers moves upward and an upper end of the one of the left and right guide followers contacts with the second travel switch.

15. The lifting cabinet of claim 14 wherein the actuator comprises a reversible electric motor and the screw rod, with the cables extending between the screw rod and the guide follower, whereby the cables are retracted to raise the shelf and the cables are extended to lower the shelf.

16. The lifting cabinet of claim 15 wherein the first and second travel switches sense the raised and lowered positions of the shelf and send the first and second stop signals to deactivate the powered actuator and thereby stop movement of the guide followers and the shelf.

* * * * *